United States Patent
Kawaguchi et al.

(10) Patent No.: US 8,044,698 B2
(45) Date of Patent: Oct. 25, 2011

(54) LIQUID LEVEL DETECTION APPARATUS

(75) Inventors: Yasunori Kawaguchi, Shizuoka (JP); Kenichi Tanaka, Shizuoka (JP); Toshio Oike, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 650 days.

(21) Appl. No.: 12/104,505

(22) Filed: Apr. 17, 2008

(65) Prior Publication Data

US 2008/0289414 A1 Nov. 27, 2008

(30) Foreign Application Priority Data

May 23, 2007 (JP) ................. 2007-136930

(51) Int. Cl.
*G01F 23/32* (2006.01)
(52) U.S. Cl. ...................................... 327/317
(58) Field of Classification Search ............... 73/317
See application file for complete search history.

(56) References Cited

U.S. PATENT DOCUMENTS

| | | | |
|---|---|---|---|
| 6,724,201 B2 | 4/2004 | Sato et al. | |
| 2002/0045682 A1* | 4/2002 | Kagawa | 523/300 |
| 2006/0042377 A1 | 3/2006 | Nakagawa et al. | |
| 2007/0205158 A1* | 9/2007 | Shanahan et al. | 210/695 |

FOREIGN PATENT DOCUMENTS

| | | |
|---|---|---|
| JP | 9-5145 A | 1/1997 |
| JP | 3898913 B2 | 1/2007 |

OTHER PUBLICATIONS

Official Communication issued May 4, 2010 in counterpart German Application No. 10 2008 021 113.3.

* cited by examiner

*Primary Examiner* — Hezron E Williams
*Assistant Examiner* — Alex Devito
(74) *Attorney, Agent, or Firm* — Sughrue Mion, PLLC

(57) ABSTRACT

A liquid level detection apparatus includes a resistance plate which has a conducting pattern formed on a board, the conducting pattern including a first slide portion, a second slide portion, a plus electrode electrically connected to the first slide portion, and a minus electrode electrically connected to the second slide portion, a float which moves in accordance with a change of a liquid level, a float arm connected to the float, a sliding arm which slides over the resistance plate in accordance with a pivotal movement of the float arm, a plus connection terminal connected to the plus electrode, a minus connection terminal connected to the minus electrode, and a protective layer formed on the plus connection terminal so as to cover the plus connection terminal.

8 Claims, 6 Drawing Sheets

LIQUID LEVEL DETECTION APPARATUS

BACKGROUND

This invention relates to a liquid level detection apparatus, and more particularly to a liquid level detection apparatus capable of detecting a liquid level within a fuel tank of an automobile using as fuel an electrolyte (alcohol) (such as ethanol, methanol, etc.) itself or gasoline containing such electrolyte.

There are known related liquid level sensors as a liquid level detection apparatus for detecting a liquid level of a fuel tank of an automobile, in which a sliding arm is slid over a resistance plate by a float moving upward and downward in accordance with a change in the liquid level, and the liquid level is converted into a potential difference, thereby detecting the liquid level (see, for example, Patent Literature and Patent Literature 2). As shown in FIG. 8, the liquid level sensor 1 disclosed in Patent Literature 1 comprises a frame 2, a float arm 3, an arm holder 4, a contact piece 5, a float 6, a resistance plate 7, and output terminals 8A and 8B.

The float 6 is mounted at one end of the float arm 3, and the other end portion of the float arm 3 is pivotally supported by a bearing portion formed integrally with the frame 2. The contact piece 5 is fixed to the arm holder 4 held on the float arm 3, and in accordance with a pivotal movement of the float arm 3, a contact provided at a distal end of the contact piece 5 is angularly moved in contacted relation to the resistance plate 7. Therefore, the liquid level is converted into a potential difference between the output terminals 8A and 8B, and is outputted. In Patent Literature 1, details of a material, etc., of the output terminals 8A and 8B, as well as an output harness connecting the output terminals 8A and 8B to an external circuit or the like, are not particularly described.

The liquid level detection apparatus disclosed in Patent literature 2 has a detection mechanism similar to that of the liquid level sensor 1 of Patent Literature 1, and includes a terminal and a connector terminal plate for connecting one end of a resistor to an external circuit. The terminal is made of phosphor bronze or beryllium copper, and one end of the terminal is contacted with the one end of the resistor by a resilient (spring) force, and the other end thereof is press-clamped to the connector terminal plate to be electrically connected thereto.

[Patent Literature 1] Japanese Patent No. 3,898,913
[Patent Literature 2] JP-A-9-5145

DISCLOSURE OF THE INVENTION

Problem that the Invention is to Solve

The liquid level detection apparatus is often used in a fuel tank of an automobile for holding as fuel an electrolyte (alcohol) (such as ethanol, methanol, etc.) itself or gasoline containing such electrolyte. When the output terminals 8A and 8B and connection terminals, etc., connected to the output terminals 8A and 8B are immersed in this fuel, the plus output terminal 8A and the plus connection terminal which have a plus potential difference relative to the minus (ground) output terminal 8B are liable to be affected by electrolysis. The magnitude of the potential difference between the output terminals 8A and 8B logarithmically affects the degree of electrolysis.

Commonly-used connection terminals are usually made of copper or copper alloy, and such connection terminals plated with tin have been extensively used, and when a potential difference develops between the output terminals 8A and 8B, the copper or the copper alloy of the plus connection terminal dissolves, and metallic ions deposit on the minus output terminal 8B to form a metallic oxide (insulator) thereon, so that a contact resistance increases. The increased contact resistance much affects the precision of the detection of the liquid level, and therefore there has been encountered a problem that the detection precision of the liquid level detection apparatus of the automobile using ethanol or ethanol-mixed gasoline as fuel is lowered.

SUMMARY

This invention has been made in view of the above circumstances, and an object of the invention is to provide a liquid level detection apparatus which is inexpensive, and prevents adverse effects of electrolysis occurring as when it is immersed in an electrolyte, and therefore can precisely detect a liquid level of a fuel tank of an automobile using ethanol or ethanol-mixed gasoline as fuel.

The above object has been achieved by a liquid level detection apparatus of the present invention having features recited in the following Paragraphs (1) to (7).

(1) A liquid level detection apparatus, comprises:
a resistance plate which has a conducting pattern formed on a board, the conducting pattern including a first slide portion, a second slide portion, a plus electrode electrically connected to the first slide portion, and a minus electrode electrically connected to the second slide portion;
a float which moves in accordance with a change of a liquid level;
a float arm having a first end and a second end, wherein the first end is attached to the float, and the second end is pivotally supported so as to be pivotally moved in accordance with the movement of the float;
a sliding arm which slides over the resistance plate in accordance with a pivotal movement of the float arm according to the liquid level;
a plus connection terminal connected to the plus electrode;
a minus connection terminal connected to the minus electrode; and
a protective layer formed on the plus connection terminal so as to cover the plus connection terminal,
wherein a potential difference developing between the plus electrode and the minus electrode corresponding to positions of the first slide portion and the second slide portion which are held in contact with the sliding arm is outputted to an external circuit via the plus connection terminal and the minus connection terminal.

(2) Preferably, the plus connection terminal is formed by applying an electrolytic corrosion-preventing treatment to a substrate to thereby cover a surface of the substrate with the protective layer and subsequently by processing the substrate into a predetermined shape, and the plus connection terminal except a cut surface thereof cut in the shaping process is covered with the protective layer.

(3) Preferably, the plus connection terminal has an engagement portion engaged with a frame receiving the resistance plate therein. A portion of the plus connection terminal except the engagement portion is covered with the protective layer.

(4) Preferably, an entire surface of the plus connection terminal is covered with the protective layer.

(5) Preferably, the liquid level detection apparatus further comprises:
a first conducting path which extends between the first slide portion and the plus electrode, and electrically connects the first slide portion and the plus electrode; and a protector formed on the first conducting path to cover the first conducting path.

(6) Preferably, the protective layer is a plating layer made of gold or gold alloy.

(7) Preferably, the protective layer is a resin layer made of resin material.

In the liquid level detection apparatus of the above Paragraph (1), the plus connection terminal for electrically connecting the plus electrode of the liquid level detection apparatus to the external circuit is covered with the protective layer which prevents the plus connection terminal from being dissolved by the electrolysis. Therefore, even when the apparatus is used in a fuel tank of an automobile using as fuel an electrolyte (such as ethanol, methanol, etc.) itself or gasoline containing such electrolyte, the dissolving of the plus connection terminal by the electrolysis is prevented, and the deposition of metallic oxide on the minus electrode is suppressed, thereby preventing a contact resistance of a contact portion from increasing. And besides, this makes it possible to precisely measure the liquid level of the electrolyte.

In the liquid level detection apparatus of the above Paragraph (2), the plus connection terminal is formed by applying the electrolytic corrosion-preventing treatment to the substrate to thereby cover the surface of the substrate with the protective layer and subsequently by processing the substrate into the predetermined shape. Therefore, the plus connection terminal except the cut surface thereof cut in the shaping process is covered with the protective layer. Therefore, the plus connection terminal which can suppress adverse effects of the electrolysis can be easily produced at a low cost.

In the liquid level detection apparatus of the above Paragraph (3), the plus connection terminal except the engagement portion engaged with the frame receiving the resistance plate therein is covered with the protective layer. Therefore, the plus connection terminal which can suppress the adverse effects of the electrolysis and can be positively engaged with the frame can be easily produced at the low cost.

In the liquid level detection apparatus of the above Paragraph (4), the entire surface of the plus connection terminal is covered with the protective layer. Therefore, the electrolytic corrosion of the plus connection terminal can be positively prevented, thereby preventing the contact resistance of the contact portion from increasing. And besides, this makes it possible to precisely measure the liquid level of the electrolyte.

The liquid level detection apparatus of the above Paragraph (5) further comprises the first conducting path which electrically connects the first slide portion and the plus electrode together, and the first conducting path is covered with the protector. Therefore, there can be produced the resistance plate at a low cost, in which adverse effects of the electrolysis exerted on the first conducting path as when the resistance plate is immersed in an electrolyte can be alleviated.

In the liquid level detection apparatus of the above Paragraph (6), the protective layer is the plating layer made of gold or gold alloy. Therefore, even when a voltage is applied between the connection terminals, the deposition of copper on the minus electrode by electrolysis can be positively prevented, thereby suppressing the contact resistance from increasing, and the liquid level of the electrolyte can be precisely measured.

In the liquid level detection apparatus of the above Paragraph (7), the protective layer is the resin layer formed to cover the plus connection terminal. Therefore, the inexpensive protective layer can be formed without using the expensive gold or gold alloy plating layer.

In the present invention, there can be provided the liquid level detection apparatus which is inexpensive, and prevents adverse effects of electrolysis occurring as when it is immersed in an electrolyte, and therefore can precisely detect a liquid level of a fuel tank of an automobile using ethanol or ethanol-mixed gasoline as fuel.

Details of the invention will become more manifest upon reading the following Section "Best Mode for Carrying Out the Invention" with reference to the accompanying drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

A preferred embodiment of the present invention will now be described in detail with reference to the drawings.

Figure 1:
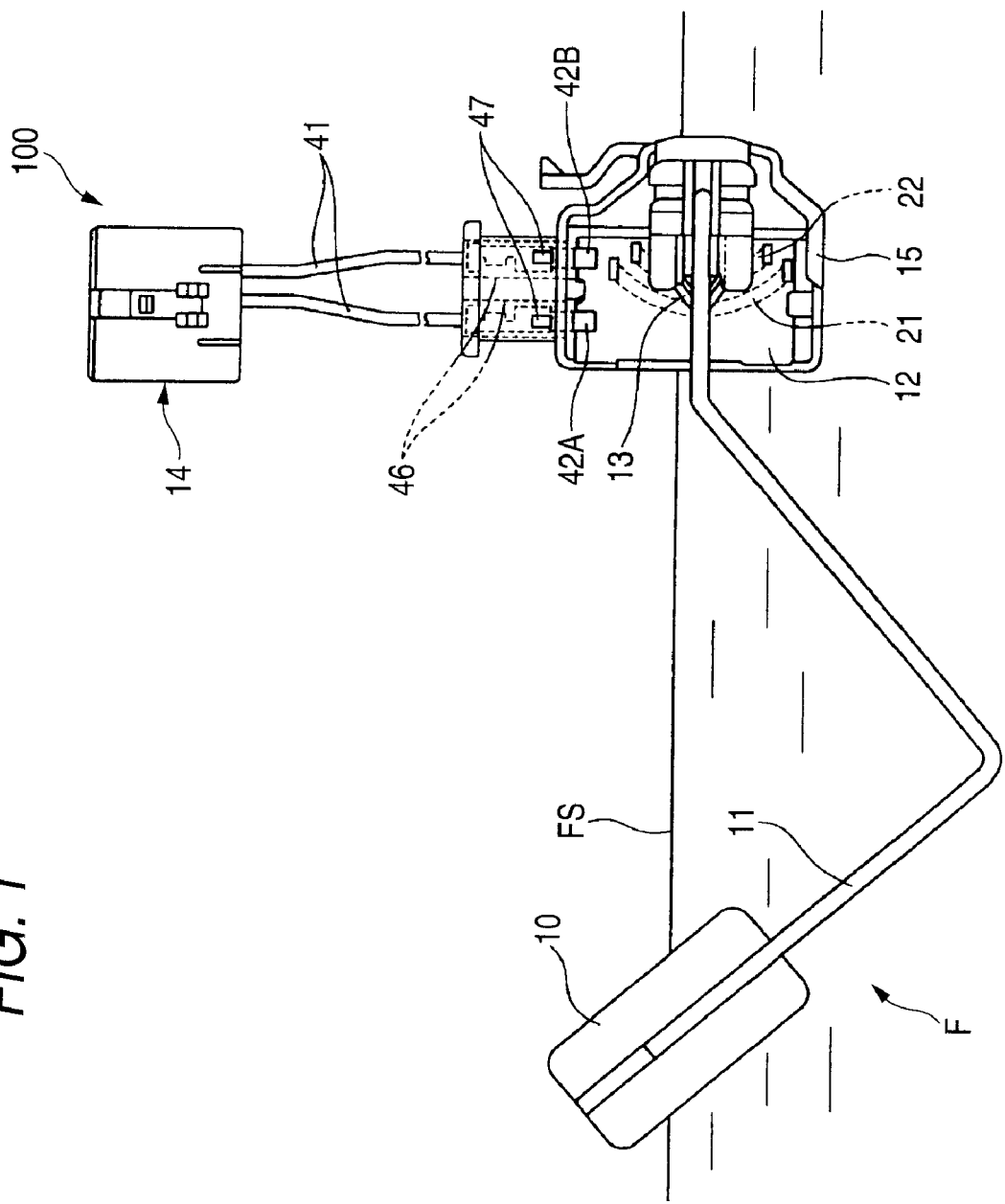
FIG. 1 is a cross-sectional view showing the construction of a liquid level detection apparatus of the present invention.
Figure 2:
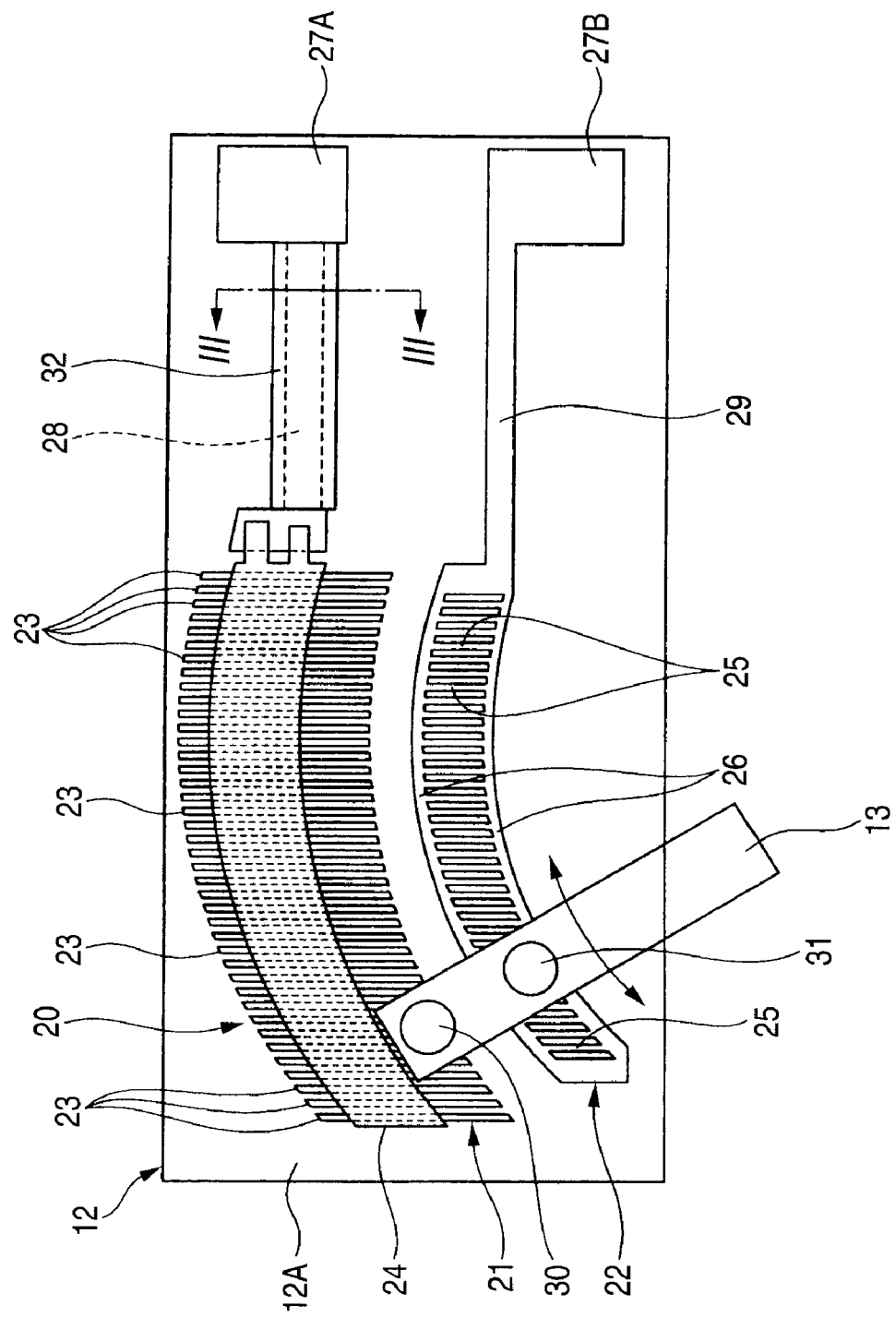
FIG. 2 is a plan view of a resistance plate in FIG. 1.
Figure 3:
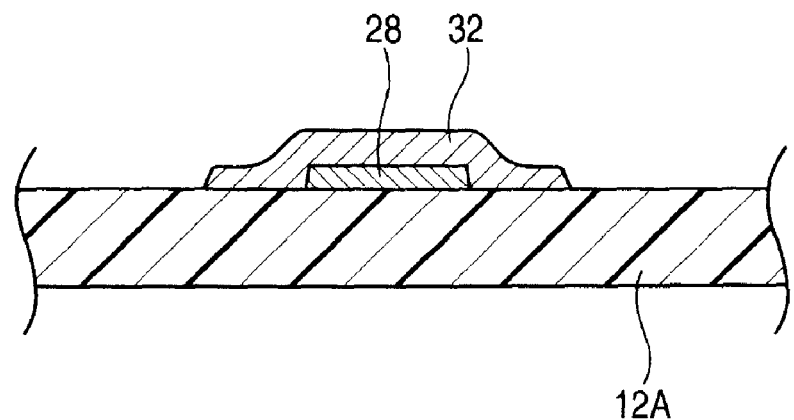
FIG. 3 is a cross-sectional view taken along the line III-III of FIG. 2.
Figure 4:
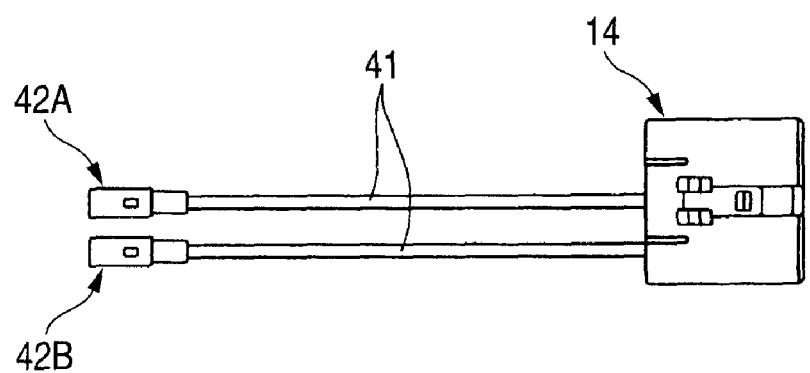
FIG. 4 is a plan view of an output harness.
Figure 5:
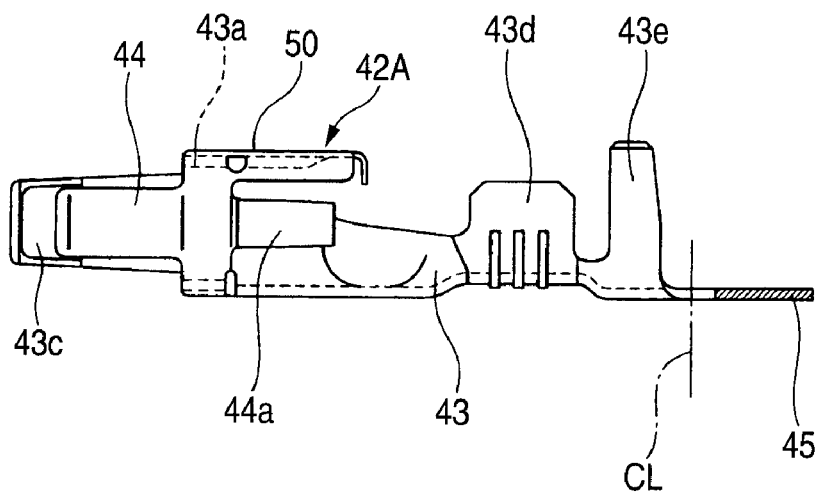
FIG. 5 is a side-elevational view of a connection terminal.
Figure 6:
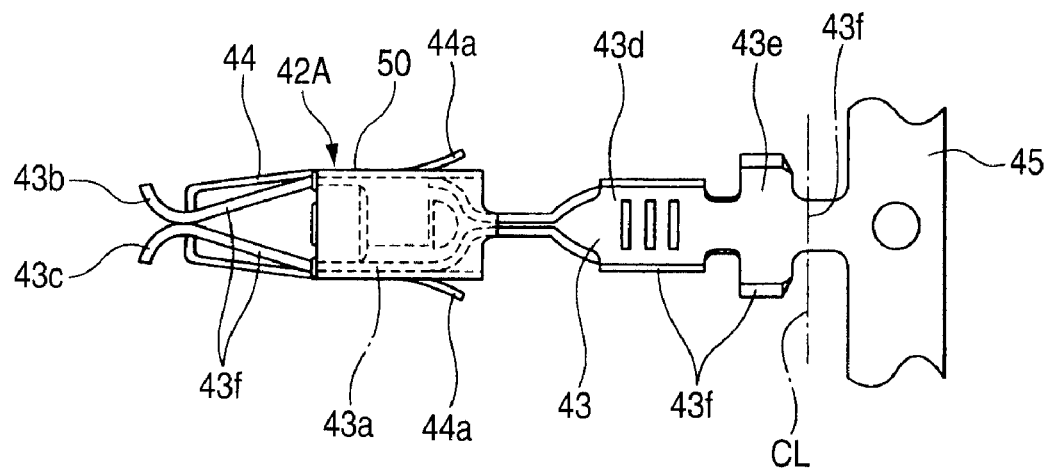
FIG. 6 is a plan view of the connection terminal.
Figure 7:
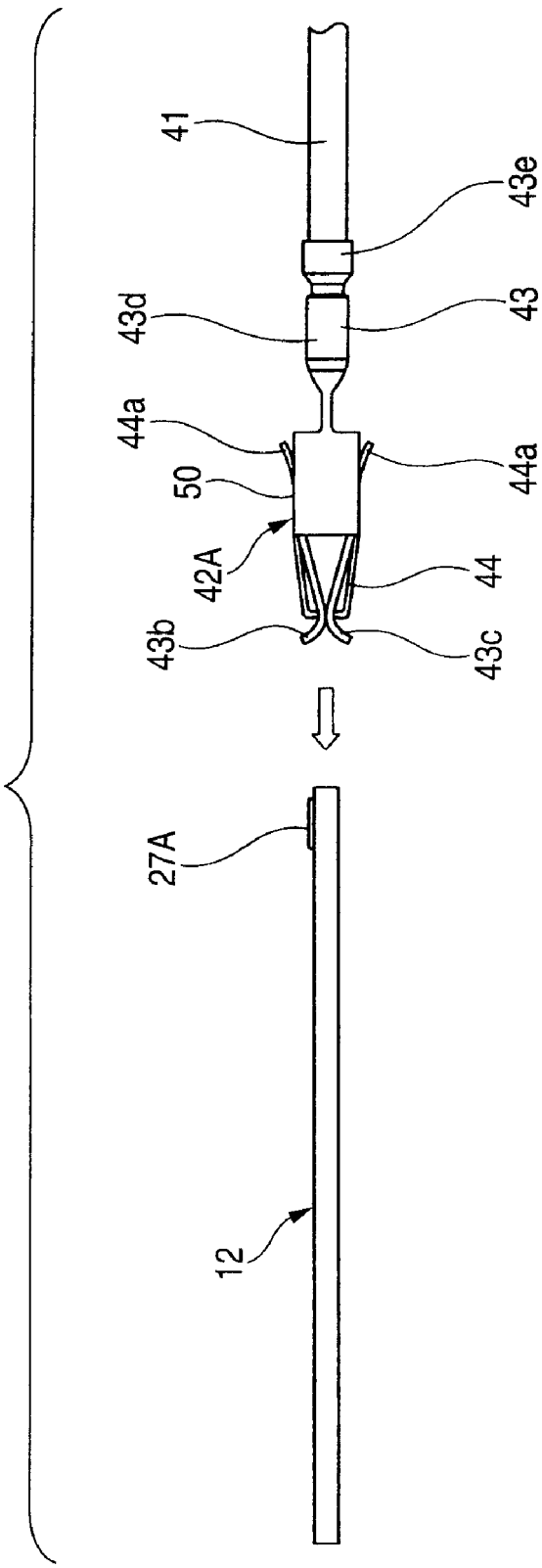
FIG. 7 is a side-elevational view showing a condition in which the connection terminal of the output harness is to be connected to an electrode of the resistance plate.
Figure 8:
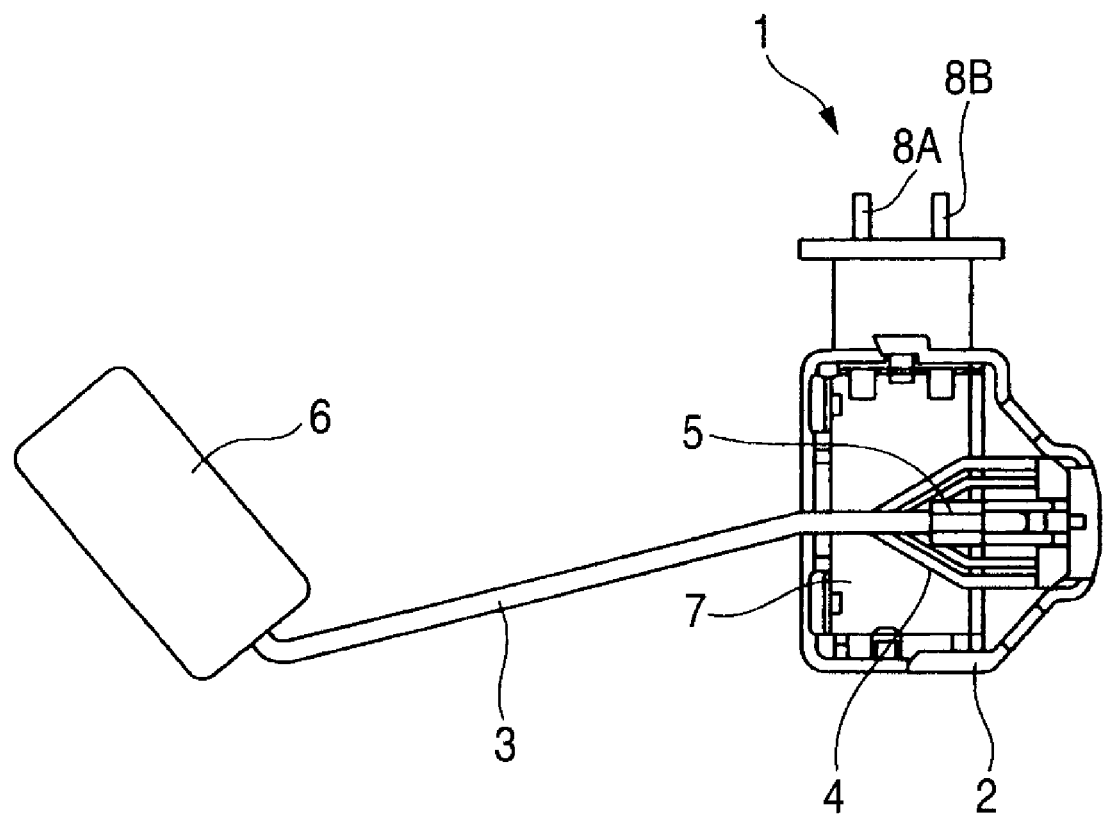
FIG. 8 is a cross-sectional view showing the construction of a related liquid level detection apparatus.

FIG. 1 is a cross-sectional view showing the construction of a liquid level detection apparatus of the present invention, FIG. 2 is a plan view of a resistance plate in FIG. 1, FIG. 3 is a cross-sectional view taken along the line III-III of FIG. 2, FIG. 4 is a plan view of an output harness, FIG. 5 is a side-elevational view of a connection terminal, FIG. 6 is a plan view of the connection terminal, and FIG. 7 is a side-elevational view showing a condition in which the connection terminal of the output harness is to be connected to an electrode of the resistance plate.

As shown in FIG. 1, the liquid level detection apparatus 100 of this embodiment is mounted on an automobile in order to detect a height of a liquid surface FS of fuel F within a fuel tank. This liquid level detection apparatus 100 comprises a float 10 for moving upward and downward in accordance with a change of a liquid level to be measured, a float arm 11, the resistance plate 12, a sliding arm 13, and the output harness 14. More specifically, the float 10 floating on the liquid surface FS of the fuel F within the fuel tank is pivotally supported on a distal end of the float arm 11. A proximal end portion of the float arm 11 bent to extend in a direction perpendicular to the sheet of FIG. 1 is rotatably supported by a bearing portion (not shown) provided at a frame 15. The resistance plate 12 and the sliding arm 13 for sliding over the resistance plate 12 in accordance with a pivotal movement of the float arm 11 are provided at the frame 15.

As shown in FIG. 2, a conducting pattern 20 is provided on the resistance plate 12, the conductive pattern 20 being made of silver palladium which has excellent electrical conductivity and also is excellent in deterioration resistance and corrosion resistance. The conducting pattern 20 includes a generally arc-shaped first slide portion 21, a generally arc-shaped second slide portion 22, a plus electrode 27A, and a minus electrode 27B, these portions 21, 22, 27A and 27B being formed on an insulating board 12A.

The first slide portion 21 includes a plurality of first conductive segments 23 arranged at intervals in a direction of sliding movement of the sliding arm 13. A resistor 24 is formed on the plurality of first conductive segments 23, and intersects a longitudinal axis of each first conductive segment 23. The resistor 24 is a resistance layer made of ruthenium oxide which is more excellent in sulfur resistance than silver palladium and besides is less liable to be deteriorated and corroded by electrolysis even when it is exposed to an electrolyte such as ethanol and methanol. The adjacent first conductive segments 23 are connected together via the resistor 24.

The second slide portion 22 includes a plurality of second conductive segments 25. These second conductive segments 25 are arranged at intervals in the direction of sliding movement of the sliding arm 13, and assume a generally arc-shape. The adjacent second conductive segments 25 are electrically connected together in a short-circuiting manner by generally arc-shaped conductive interconnecting portions 26.

The plus electrode 27A and a first conducting path 28 (which are part of the conducting pattern 20 made of silver palladium) are disposed adjacent to one end of the first slide portion 21. The first conducting path 28 electrically connects the first slide portion 21 and the plus electrode 27A together. The minus electrode 27B and a second conducting path 29 (which are part of the conducting pattern 20 made of silver palladium) are disposed adjacent to one end of the second slide portion 22. The second conducting path 29 electrically connects the second slide portion 22 and the minus electrode 27B together.

The sliding arm 13 is formed of an electrically conductive material, and includes a first contact portion 30 for sliding over the first slide portion 21, and a second contact portion 31 for sliding over the second slide portion 22. The first contact portion 30 of the sliding arm 13 contacts the corresponding first conductive segment 23, while the second contact portion 31 of the sliding arm 13 contacts the corresponding second conductive segment 25, so that the first slide portion 21 and the second slide portion 22 are electrically connected together via the sliding arm 13.

A protector 32 is formed on the first conducting path 28 to cover this first conducting path 28 as shown in FIG. 3. The protector 32 is made of the same material as that of the resistor 24. Namely, this protector 32 is also a resistance layer made of ruthenium oxide which is more excellent in sulfur resistance than silver palladium and besides is less liable to be deteriorated and corroded by electrolysis (in other words, the electrolysis is less liable to occur) even when it is exposed to an electrolyte such as ethanol and methanol. Therefore, the protector 32 can prevent the electrolysis from occurring at the first conducting path 28.

Incidentally, with respect to the formation of a circuit pattern on the resistance plate 12, the first slide portion 21, the first conducting path 28, the plus electrode 27A, the second slide portion 22, the second conducting path 29 and the minus electrode 27B are formed on the insulating board 12A by screen printing or the like, and then the resistor 24 and the protector 32 are formed by screen printing or the like.

As shown in FIG. 4, the output harness 14 is provided for outputting a potential difference between the plus electrode 27A and the minus electrode 27B to an external circuit (not shown) via conducting wires 41. The output harness 14 includes a plus connection terminal 42A for connection to the plus electrode 27A, and a minus connection terminal 42B for connection to the minus electrode 27B.

As shown in FIGS. 5 and 6, the plus connection terminal 42A and the minus connection terminal 42B have substantially the same shape except that the plus connection terminal 42A necessarily has a protective layer 50 (described later). Each of the plus connection terminal 42A and the minus connection terminal 42B comprises a contacting member 43, and a retaining member 44 for retaining the connection terminal 42A, 42B on the frame 15. The contacting member 43 of the plus connection terminal 42A electrically connects the plus electrode 27A to the corresponding conducting wire 41, while the contacting member 43 of the minus connection terminal 42B electrically connects the minus electrode 27B to the corresponding conducting wire 41.

The contacting member 43 is formed by pressing a thin sheet made of a conductive material (such for example as copper or copper alloy) into a predetermined shape, and tin plating is applied to a surface of the contacting member 43. A pair of contacting piece portions 43b and 43c extend forwardly respectively from a pair of opposed walls of a body portion 43a of a generally square cross-section. Distal end portions of the pair of contacting piece portions 43b and 43c are arcuately bent away from each other. Press-clamping portions 43d and 43e of a generally U-shaped cross-section are provided rearwardly of the body portion 43a, and are to be press-clamped respectively onto a conductor and a sheath of the conducting wire 41. A plurality of contacting members 43 of this shape are produced in such a manner that these contacting members 43 are connected to a strip-like carrier 45 and disposed at predetermined intervals. In use, the contacting member 43 is cut off from the carrier 45 along a cutting line CL. As a result of cutting-off of the contacting member 43 from the carrier 45, a cut surface 43f is formed at the contacting member 43.

The plus connection terminal 42A is covered with the protective layer 50, and therefore has been subjected to an electrolytic corrosion-preventing treatment. Naturally, an electrolytic corrosion-preventing treatment can also be applied to the minus connection terminal 42B to thereby cover it with a protective layer 50. However, the minus connection terminal 42B is much less affected by the electrolysis as compared with the plus connection terminal 42A, and therefore does not always need to undergo such an electrolytic corrosion-preventing treatment. However, when the plus connection terminal 42A and the minus connection terminal 42B are formed into the same specifications, it is not necessary to distinguish the plus connection terminal 42A and the minus connection terminal 42B from each other at the time of effecting an assembling operation, and therefore there is no fear that an assembling error occurs, and the assembling operation can be carried out easily.

The retaining member 44 is made, for example, of a thin stainless steel sheet, and is formed into a generally square cross-section, and has an internal dimension slightly larger than an external dimension of the body portion 43a of the contacting member 43. Rear end portions of opposite side walls of the retaining member 44 are stamped out, and these stamped-out portions are bent outwardly to form a pair of engagement portions 44a, respectively. The retaining member 44 is fixedly fitted on the body portion 43a of the contacting member 43, and cooperates with contacting member 43 to form the connection terminal 42A, 42B.

The plus connection terminal 42A can be produced by each of the following processing methods.

In the first processing method, first, gold or gold alloy is plated on an entire surface of a strip-like thin sheet of phosphor bronze to form the protective layer 50 thereon. Thereafter, the thin sheet is formed by pressing into the shape of the contacting member 43. Then, the retaining member 44 made of stainless steel is fixedly fitted on the body portion 43a of the contacting member 43. In the thus formed contacting member 43, most of the entire surface thereof is covered with the protective layer (the plating layer made of gold or gold alloy) 50. However, a cut surface 43f is formed at and along an edge (that is, an end surface defining the contour of the contacting member 43) of the contacting member 43 press-cut or blanked from the thin sheet in the pressing operation, and therefore the protective layer 50 is not formed on the cut surface 43f. The retaining member 44 made of stainless steel also is not provided with such a protective layer 50. With this processing method, the plus connection terminal 42A can be formed most easily.

In the second processing method, a strip-like thin sheet made of phosphor bronze is formed by pressing into such a shape that the shaped sheet has a plurality of contacting member 43 integrally connected to a carrier 45. Thereafter, gold or gold alloy is plated on an entire surface of the shaped sheet to form a protective layer 50 thereon. Each of the thus formed contacting members 43 is cut off from the carrier 45 along the cutting line CL. In this contacting member 43, only the cut surface 43f along the cutting line CL is not protected by the protective layer 50, but the other portion has the protective layer 50 formed thereon, and therefore is protected from electrolytic corrosion. It is ideal to cover the entire surface of the plus connection terminal 42A with the protective layer 50. However, even when part (the cut surface 43f of the contacting member 43, the retaining member 44, etc.) of the plus connection terminal 42A is not covered with the protective layer 50, adverse effects of the electrolysis can be greatly alleviated. The degree of electrolytic corrosion is determined by the material and exposed area of the connection terminal, and therefore it is preferred to select a material having a low ionization tendency and also to decrease the exposed area.

In the third processing method, a strip-like thin sheet made of phosphor bronze is formed by pressing into such a shape that the shaped sheet has a plurality of contacting member 43 integrally connected to a carrier 45. Then, the contacting members 43 are cut off from the carrier 45, and thereafter gold or gold alloy is plated on an entire surface of each of the contacting members 43 to form a protective layer 50 thereon. Each of thus formed contacting members 43 is protected at its entire surface by the protective layer 50, and therefore can most effectively prevent electrolytic corrosion.

As shown in FIGS. 1 and 7, the plus connection terminal 42A and the minus connection terminal 42B are inserted respectively into terminal receiving portions 46 each in the form of a square hole formed in the frame 15, and the pair of contacting piece portions 43b and 43c of each connection terminal 42A, 42B hold the resistance plate 12 therebetween. As a result, the pair of contacting piece portions 43b and 43c of the plus connection terminal 42A (the minus connection terminal 42B) is contacted with the plus electrode 27A (the minus electrode 27B) by a spring force, and is electrically connected thereto. At this time, the pair of engagement portions 44a formed on the retaining portion 44 of each connection terminal 42A, 42B are engaged respectively with rear wall surfaces of a retaining hole 47 formed in the frame 15, thereby preventing withdrawal of the connection terminal 42A, 42B from the frame 15. Thus, the connection of the plus connection terminal 42A and minus connection terminal 42B to the resistance plate 12 (that is, to the plus electrode 27A and the minus electrode 27B) is ensured.

When detecting the liquid level, a potential difference develops between the plus electrode 27A and the minus electrode 27B (that is, between the plus connection terminal 42A and the minus connection terminal 42B), and therefore the plus connection terminal 42A is affected by the electrolysis as described above. However, in the present invention, gold or gold alloy having a low ionization tendency is plated on the plus connection terminal 42A to form the protective layer 50 thereon, and therefore the plus connection terminal 42A will not be dissolved by the electrolysis. Therefore, the deposition of metallic oxide on the minus electrode 27B (the minus connection terminal 42B) is prevented. As a result, a contact pressure is prevented from increasing, and the liquid level of the fuel F such as ethanol or ethanol-mixed gasoline can be measured precisely.

The material for forming the connection terminals 42A and 42B is not limited to copper or copper alloy, and gold, gold alloy, nickel, nickel alloy, etc., can be used.

The present invention is not limited to the above embodiment, and suitable modifications, improvements, etc., can be made. Furthermore, the material, shape, dimensions, numerical value, form, number, disposition, etc., of each of the constituent elements of the above embodiment are arbitrary, and are not limited in so far as the invention can be achieved.

For example, in the above embodiment, although the gold plating or the gold alloy plating is used to form the protective layer 50 for the connection terminals 42A and 42B made of copper or copper alloy, there can be used a method in which the connection terminals 42A and 42B are connected respectively to the electrodes 27A and 27B, and thereafter a resin material is coated on the whole of connected portions (the connection terminals 42A and 42B and the electrodes 27A and 27B) to form a protective layer made of this resin material. By doing so, the connection terminals 42A and 42B and the electrodes 27A and 27B are prevented from contacting the electrolyte. Examples of such resin material include a polyester resin, an epoxy resin and a fluororesin.

Furthermore, in the above embodiment, although the pair of contacting piece portions 43b and 43c of the contacting member 43 of the connection terminal 42A, 42B hold the resistance plate 12 therebetween, thereby electrically connecting the connection terminal to the electrode 27A, 27B. However, the invention can be applied also to the type of connected portion in which a terminal is pressed into contact with one end (plus electrode) of a conducting pattern by a resilient force.

Furthermore, although the detection apparatus is connected to the external circuit via the output harness 14 connected to the resistance plate 12 by the plus connection terminal 42A and the minus connection terminal 42B, the plus connection terminal 42A and the minus connection terminal 42B may be connected directly to the external circuit.

The formation of the protector 32 may be omitted.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-136930 filed on May 23, 2007, the contents of which are incorporated herein for reference.

What is claimed is:

1. A liquid level detection apparatus, comprising:
a resistance plate which has a conducting pattern formed on a board, the conducting pattern including a first slide portion, a second slide portion, a plus electrode electrically connected to the first slide portion, and a minus electrode electrically connected to the second slide portion;

a float which moves in accordance with a change of a liquid level;

a float arm having a first end and a second end, wherein the first end is attached to the float, and the second end is pivotally supported so as to be pivotally moved in accordance with the movement of the float;

a sliding arm which slides over the resistance plate in accordance with a pivotal movement of the float arm according to the liquid level;

a plus connection terminal connected to the plus electrode;

a minus connection terminal connected to the minus electrode; and a protective layer formed on the plus connection terminal so as to cover the plus connection terminal, wherein a potential difference developing between the plus electrode and the minus electrode corresponding to positions of the first slide portion and the second slide portion which are held in contact with the sliding arm is outputted to an external circuit via the plus connection terminal and the minus connection terminal;

wherein the protective layer is a plating layer made of gold or gold alloy; and wherein the protective layer prevents the minus electrode from being subjected to deposition of a metal oxide caused by metallic ions dissolved from the plus electrode by the electrolysis;

wherein the plus connection terminal is formed by applying an electrolytic corrosion-preventing treatment to a substrate to thereby cover a surface of the substrate with the protective layer and subsequently by processing the substrate into a predetermined shape, and the plus connection terminal except a cut surface thereof cut in the shaping process is covered with the protective layer;

wherein the plus connection terminal has an engagement portion engaged with a frame receiving the resistance plate therein; and wherein a portion of the plus connection terminal except the engagement portion is covered with the protective layer.

2. The liquid level detection apparatus according to claim 1, wherein an entire surface of the plus connection terminal is covered with the protective layer.

3. A liquid level detection apparatus comprising:

a resistance plate which has a conducting pattern formed on a board, the conducting pattern including a first slide portion, a second slide portion, a plus electrode electrically connected to the first slide portion, and a minus electrode electrically connected to the second slide portion;

a float which moves in accordance with a change of a liquid level;

a float arm having a first end and a second end, wherein the first end is attached to the float, and the second end is pivotally supported so as to be pivotally moved in accordance with the movement of the float;

a sliding arm which slides over the resistance plate in accordance with a pivotal movement of the float arm according to the liquid level;

a plus connection terminal connected to the plus electrode;

a minus connection terminal connected to the minus electrode; and a protective layer formed on the plus connection terminal so as to cover the plus connection terminal, wherein a potential difference developing between the plus electrode and the minus electrode corresponding to positions of the first slide portion and the second slide portion which are held in contact with the sliding arm is outputted to an external circuit via the plus connection terminal and the minus connection terminal;

wherein the protective layer is a plating layer made of gold or gold alloy;

wherein the protective layer prevents the minus electrode from being subjected to deposition of a metal oxide caused by metallic ions dissolved from the plus electrode by the electrolysis; and wherein the apparatus further comprises:

a first conducting path which extends between the first slide portion and the plus electrode, and electrically connects the first slide portion and the plus electrode; and a protector formed on the first conducting path to cover the first conducting path.

4. A liquid level detection apparatus comprising:

a resistance plate which has a conducting pattern formed on a board, the conducting pattern including a first slide portion, a second slide portion, a plus electrode electrically connected to the first slide portion, and a minus electrode electrically connected to the second slide portion;

a float which moves in accordance with a change of a liquid level;

a float arm having a first end and a second end, wherein the first end is attached to the float, and the second end is pivotally supported so as to be pivotally moved in accordance with the movement of the float;

a sliding arm which slides over the resistance plate in accordance with a pivotal movement of the float arm according to the liquid level;

a plus connection terminal connected to the plus electrode;

a minus connection terminal connected to the minus electrode; and a protective layer formed on the plus connection terminal so as to cover the plus connection terminal, wherein a potential difference developing between the plus electrode and the minus electrode corresponding to positions of the first slide portion and the second slide portion which are held in contact with the sliding arm is outputted to an external circuit via the plus connection terminal and the minus connection terminal;

wherein the protective layer is a plating layer made of gold or gold alloy; and wherein the protective layer prevents the minus electrode from being subjected to deposition of a metal oxide caused by metallic ions dissolved from the plus electrode by the electrolysis, wherein the plus connection terminal is formed by applying an electrolytic corrosion-preventing treatment to a substrate to thereby cover a surface of the substrate with the protective layer and subsequently by processing the substrate into a predetermined shape, and the plus connection terminal except a cut surface thereof cut in the shaping process is covered with the protective layer; and wherein the apparatus further comprises:

a first conducting path which extends between the first slide portion and the plus electrode, and electrically connects the first slide portion and the plus electrode; and a protector formed on the first conducting path to cover the first conducting path.

5. The liquid level detection apparatus according to claim 1, further comprising:

a first conducting path which extends between the first slide portion and the plus electrode, and electrically connects the first slide portion and the plus electrode; and a protector formed on the first conducting path to cover the first conducting path.

6. A liquid level detection apparatus comprising:

a resistance plate which has a conducting pattern formed on a board, the conducting pattern including a first slide portion, a second slide portion, a plus electrode electrically connected to the first slide portion, and a minus electrode electrically connected to the second slide portion;

a float which moves in accordance with a change of a liquid level;

a float arm having a first end and a second end, wherein the first end is attached to the float, and the second end is pivotally supported so as to be pivotally moved in accordance with the movement of the float;

a sliding arm which slides over the resistance plate in accordance with a pivotal movement of the float arm according to the liquid level;

a plus connection terminal connected to the plus electrode;

a minus connection terminal connected to the minus electrode; and a protective layer formed on the plus connection terminal so as to cover the plus connection terminal, wherein a potential difference developing between the plus electrode and the minus electrode corresponding to positions of the first slide portion and the second slide portion which are held in contact with the sliding arm is outputted to an external circuit via the plus connection terminal and the minus connection terminal;

wherein the protective layer is a plating layer made of gold or gold alloy; and wherein the protective layer prevents the minus electrode from being subjected to deposition of a metal oxide caused by metallic ions dissolved from the plus electrode by the electrolysis, wherein an entire surface of the plus connection terminal is covered with the protective layer; and wherein the apparatus further comprises:

a first conducting path which extends between the first slide portion and the plus electrode, and electrically connects the first slide portion and the plus electrode; and a protector formed on the first conducting path to cover the first conducting path.

7. A liquid level detection apparatus, comprising:

a resistance plate which has a conducting pattern formed on a board, the conducting pattern including a first slide portion, a second slide portion, a plus electrode electrically connected to the first slide portion, and a minus electrode electrically connected to the second slide portion;

a float which moves in accordance with a change of a liquid level;

a float arm having a first end and a second end, wherein the first end is attached to the float, and the second end is pivotally supported so as to be pivotally moved in accordance with the movement of the float;

a sliding arm which slides over the resistance plate in accordance with a pivotal movement of the float arm according to the liquid level;

a plus connection terminal connected to the plus electrode;

a minus connection terminal connected to the minus electrode; and a protective layer formed on the plus connection terminal so as to cover the plus connection terminal, wherein a potential difference developing between the plus electrode and the minus electrode corresponding to positions of the first slide portion and the second slide portion which are held in contact with the sliding arm is outputted to an external circuit via the plus connection terminal and the minus connection terminal, wherein the plus connection terminal is formed by applying an electrolytic corrosion-preventing treatment to a substrate to thereby cover a surface of the substrate with the protective layer and subsequently by processing the substrate into a predetermined shape, and the plus connection terminal except a cut surface thereof cut in the shaping process is covered with the protective layer, wherein the plus connection terminal has an engagement portion engaged with a frame receiving the resistance plate therein and wherein a portion of the plus connection terminal except the engagement portion is covered with the protective layer.

8. A liquid level detection apparatus, comprising:

a resistance plate which has a conducting pattern formed on a board, the conducting pattern including a first slide portion, a second slide portion, a plus electrode electrically connected to the first slide portion, and a minus electrode electrically connected to the second slide portion;

a float which moves in accordance with a change of a liquid level;

a float arm having a first end and a second end, wherein the first end is attached to the float, and the second end is pivotally supported so as to be pivotally moved in accordance with the movement of the float;

a sliding arm which slides over the resistance plate in accordance with a pivotal movement of the float arm according to the liquid level;

a plus connection terminal connected to the plus electrode;

a minus connection terminal connected to the minus electrode; and a protective layer formed on the plus connection terminal so as to cover the plus connection terminal, wherein a potential difference developing between the plus electrode and the minus electrode corresponding to positions of the first slide portion and the second slide portion which are held in contact with the sliding arm is outputted to an external circuit via the plus connection terminal and the minus connection terminal further comprising:

a first conducting path which extends between the first slide portion and the plus electrode, and electrically connects the first slide portion and the plus electrode; and a protector formed on the first conducting path to cover the first conducting path.

\* \* \* \* \*